No. 622,266. Patented Apr. 4, 1899.
W. J. RITTER.
BUSH FOR BUNG HOLES.
(Application filed May 18, 1898.)
(No Model.)
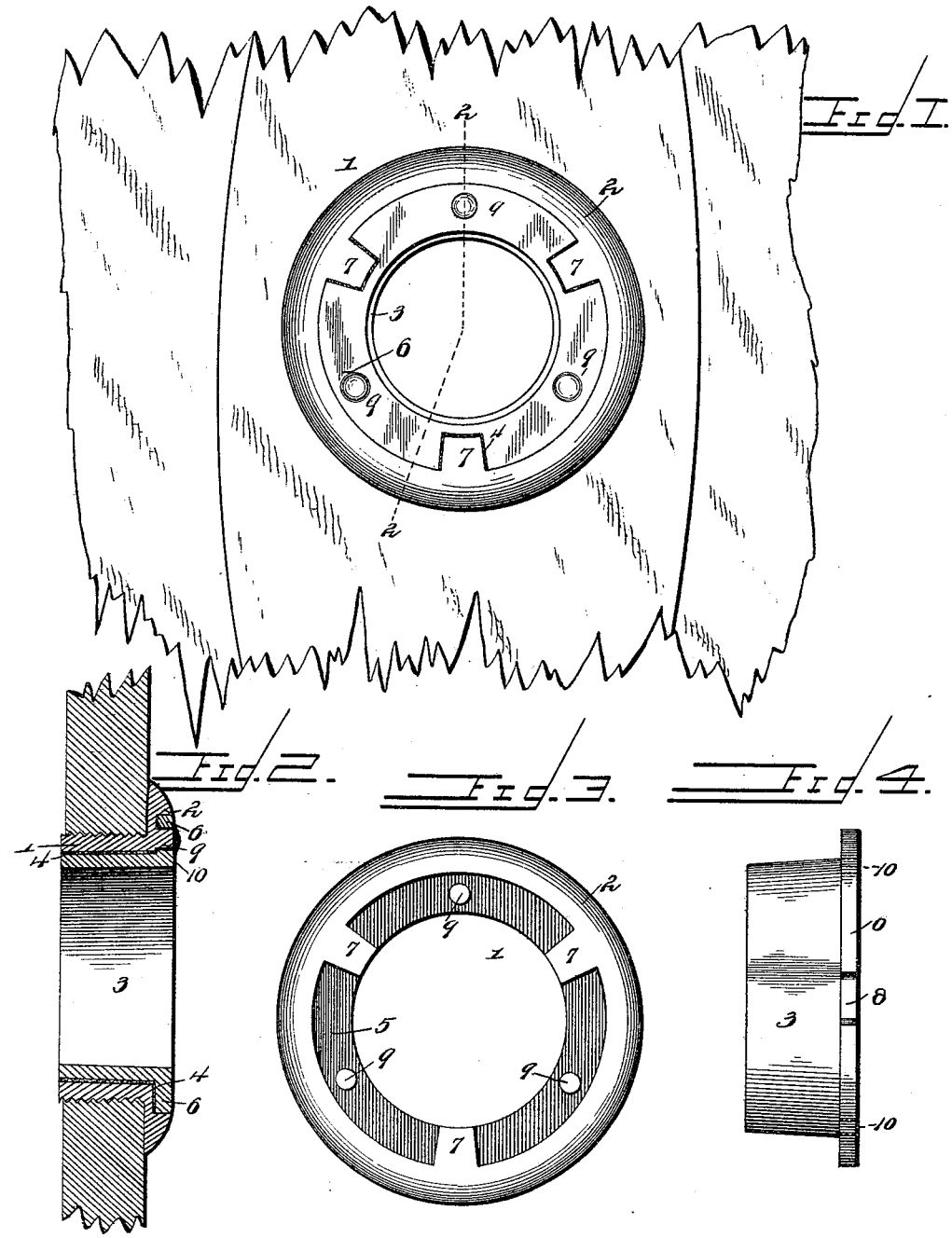

UNITED STATES PATENT OFFICE.

WILLIAM JOHN RITTER, OF DAVENPORT, IOWA.

BUSH FOR BUNG-HOLES.

SPECIFICATION forming part of Letters Patent No. 622,266, dated April 4, 1899.

Application filed May 18, 1898. Serial No. 681,074. (No model.)

*To all whom it may concern:*

Be it known that I, WILLIAM JOHN RITTER, a citizen of the United States, residing at Davenport, in the county of Scott and State of Iowa, have invented a new and useful Bush for Bung-Holes, of which the following is a specification.

My invention relates to a bung-bush adapted for use in connection with casks, barrels, and other receptacles which in practice are subjected to what is known in the art as the "pitching" operation, and is designed to protect the material of the receptacle contiguous to the bung-hole during the pitching operation. In practice the pitch upon the walls of the cask, barrel, or keg is liquefied by means of hot air blown into the receptacle through an iron tube inserted into the bung-hole, and owing to the intense heat this tube frequently becomes red-hot, and although the operation requires only from one to two minutes the charring of the material of the receptacle often occurs, and thus causes the bung to leak.

The object of my invention is to provide a bush of such a construction as to act as a nonconductor, whereby the heat of the hot-air-supply tube is not conducted to the exterior surface of the bush, and hence is not communicated to the material of the receptacle, and, furthermore, to provide a bush of simple and efficient construction which may be applied to old barrels or receptacles wherein the bungholes have been charred, and thus increased in size beyond that which is efficient in practice, without the use of an article having the general objects of my invention.

Further objects and advantages of this invention will appear in the following description, and the novel features thereof will be particularly pointed out in the appended claims.

In the drawings, Figure 1 is a view of a bush constructed in accordance with my invention applied in the operative position to a barrel, a portion of the latter being shown. Fig. 2 is a central sectional view of the same, taken on the line 2 2 of Fig. 1. Fig. 3 is a face view of the exterior member of the bush.
Fig. 4 is a side view of the interior member of the same.

Similar numerals of reference indicate corresponding parts in all the figures of the drawings.

The bush embodying my invention comprises an exterior member 1, consisting of an exteriorly-threaded cylinder terminating at its outer end in a lateral flange 2, an interior tubular member 3, having an interior diameter which corresponds with that of the ordinary bung-hole, and hence is adapted to receive the ordinary bung or the hot-air-supply pipe of a "pitching-machine," and a heatnon-conducting packing or ring 4, of asbestos or equivalent material, interposed between the exterior surface of the interior bush member and the interior surface of the exterior member. The face of the outer end of the exterior bush member is cut away to form a seat 5, adapted to receive an outward flange 6 on the outer end of the inner bush member, and in this seat at intervals are arranged lugs 7 to engage notches 8, formed in said flange 6, whereby relative rotary movement of the inner and outer bush members is prevented.
Said lugs and notches form an interlocking connection between the members, whereby the turning of a tap or other object in the bore of the inner member will not affect the relative positions of the bush members or cause the displacement of the interposed packing-ring. Also as an efficient and at the same time simple means of securing the inner and outer bush members in their normal interlocked positions I employ rivet-studs 9, preferably rising from the floor of the seat in the outer end of the exterior bush member and fitted in perforations 10 in the flange 6 of the inner bush member. The outer extremities of these rivet-studs may be swaged or headed after the arrangement of the packing-ring to secure the parts in the positions desired.

It will be seen that the lateral flange of the exterior members serves to protect the portion of the material of the receptacle around the bung-hole, and the communication of heat from the flange of the interior bush member to the seat of the exterior bush member is prevented by an outwardly-flanged portion 11 of the packing-ring.

The exterior diameter of the outer bush member being greater than that of the ordinary bung-hole is adapted to fit in the bung-hole of a receptacle which, being previously unprovided with the device embodying my invention, has become charred and requires enlarging in order to remove the charred portion of the material.

Various changes in the form, proportion, and the minor details of construction may be resorted to without departing from the spirit or sacrificing any of the advantages of this invention.

Having described my invention, what I claim is—

1. A bung-bush comprising inner and outer concentric annular walls provided at their outer ends with interlocked faces for preventing relative rotation of the walls, and a packing-ring of heat-non-conducting material interposed between said walls, substantially as specified.

2. A bung-bush comprising an outer member provided with an outwardly-extending flange and cut away in its face to form a seat, an inner member fitted concentrically in the outer member and provided with a flange fitted in said seat, means for securing the flange of the inner member in the seat in the flange of the outer member, and a heat-non-conducting packing-ring interposed between the inner and outer members and provided with a flanged outer end between the flange of the inner member and the floor of the seat in the flange of the outer member, substantially as specified.

3. A bung-bush consisting of an exterior member provided at its outer end with a flange having an annular seat, an interior member arranged concentrically in the exterior member and provided at its outer end with a flange fitted in said seat and provided with notches, fixed lugs on the exterior member engaged with said notches in the flange of the interior member, and a heat-non-conducting packing-ring interposed between the exterior and interior members, substantially as specified.

4. A bung-bush comprising interior and exterior concentric members provided at their outer ends with outwardly-extending flanges, the interior member having its flange fitted in a seat in the outer face of the flange of the exterior member and provided with notches for engaging fixed lugs on the flange of said exterior member, rivet-studs projecting from the floor of the seat in the exterior member and engaged with openings in the flange of the interior member, and a heat-non-conducting packing-ring interposed between the exterior and interior members, substantially as specified.

In testimony that I claim the foregoing as my own I have hereto affixed my signature in the presence of two witnesses.

WILLIAM JOHN RITTER.

Witnesses:
  Fr. Prentice, Jr.,
  Chas. Crump, Jr.